United States Patent
Kim et al.

(10) Patent No.: US 9,959,622 B2
(45) Date of Patent: May 1, 2018

(54) METHOD AND APPARATUS FOR SUPPORTING DIAGNOSIS OF REGION OF INTEREST BY PROVIDING COMPARISON IMAGE

(71) Applicant: SAMSUNG ELECTRONICS CO., LTD., Suwon-si (KR)

(72) Inventors: Ha Young Kim, Yongin-si (KR); Hye Jin Kam, Seongnam-si (KR); Ye Hoon Kim, Seoul (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 167 days.

(21) Appl. No.: 14/804,765

(22) Filed: Jul. 21, 2015

(65) Prior Publication Data

US 2016/0027175 A1    Jan. 28, 2016

(30) Foreign Application Priority Data

Jul. 23, 2014 (KR) ......................... 10-2014-0093584

(51) Int. Cl.
    *G06T 7/00*    (2017.01)

(52) U.S. Cl.
    CPC .. *G06T 7/0016* (2013.01); *G06T 2207/10016* (2013.01); *G06T 2207/10132* (2013.01); *G06T 2207/30096* (2013.01)

(58) Field of Classification Search
    CPC ........... G06T 2207/30096; G06T 7/001; G06T 2207/10132
    See application file for complete search history.

(56) References Cited

U.S. PATENT DOCUMENTS

| | | | |
|---|---|---|---|
| 6,468,212 | B1 | 10/2002 | Scott et al. |
| 6,824,514 | B2 | 11/2004 | Poland et al. |
| 8,600,133 | B2 * | 12/2013 | Buelow ................. G06T 7/0012 382/128 |

(Continued)

FOREIGN PATENT DOCUMENTS

| | | |
|---|---|---|
| JP | 08-019543 A | 1/1996 |
| JP | 2001-212138 A | 8/2001 |

(Continued)

OTHER PUBLICATIONS

Ukwatta, E., et al. "Three-dimensional semi-automated segmentation of carotid atherosclerosis from three-dimensional ultrasound images." *SPIE Medical Imaging.* International Society for Optics and Photonics, 2012, 7 Pages.

*Primary Examiner* — Siamak Harandi
(74) *Attorney, Agent, or Firm* — Jefferson IP Law, LLP

(57) ABSTRACT

Technology related to an apparatus and method for supporting a diagnosis of a lesion is provided. The apparatus includes a standard image determiner to determine, as a standard image, an image where a region of interest (ROI) is detected among a plurality of images received from an image collecting device, a candidate image extractor to extract one or more candidate images with respect to the determined standard image, a comparison image selector to select one or more comparison images for supporting a diagnosis of the ROI from the one or more candidate images, and an interface to provide a user with an output result of the standard image and the one or more selected comparison images.

20 Claims, 11 Drawing Sheets

(56) References Cited

U.S. PATENT DOCUMENTS

| | | | | |
|---|---|---|---|---|
| 2009/0143676 A1* | 6/2009 | Matsumura | ............. | A61B 8/08 600/438 |
| 2009/0299181 A1 | 12/2009 | Ito et al. | | |
| 2011/0245673 A1* | 10/2011 | Kamiyama | ............. | A61B 8/08 600/443 |

FOREIGN PATENT DOCUMENTS

| | | |
|---|---|---|
| JP | 2004-255180 A | 9/2004 |
| JP | 2006-325746 A | 12/2006 |
| JP | 2007-190172 A | 8/2007 |
| WO | WO 93/25141 | 12/1993 |
| WO | WO 2007/046272 A1 | 4/2007 |

\* cited by examiner

FIG. 5
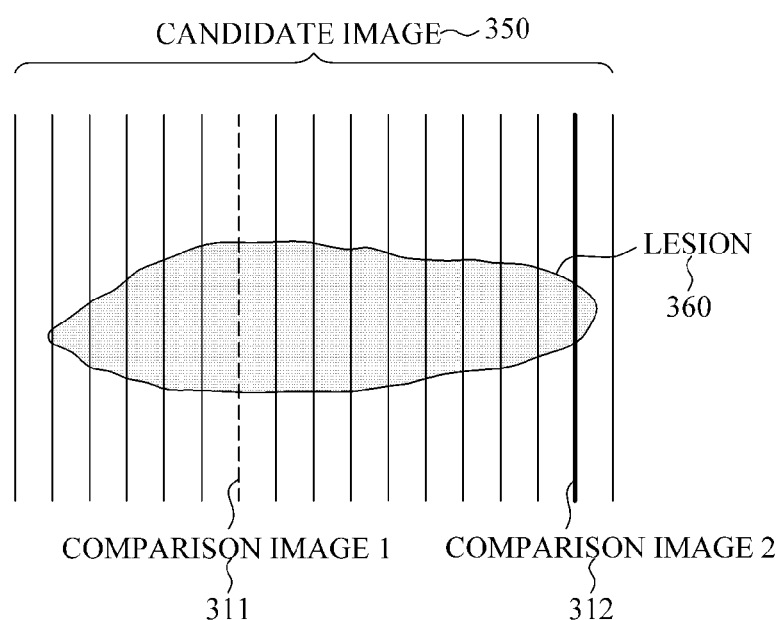
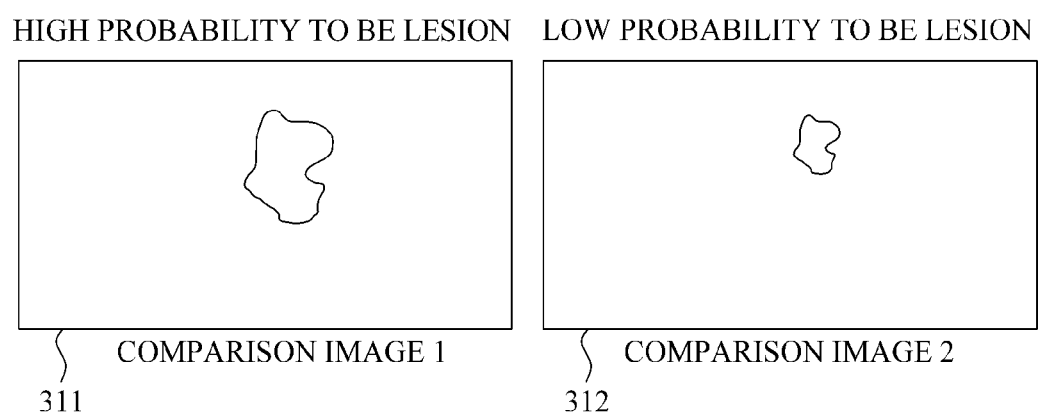

FIG. 7
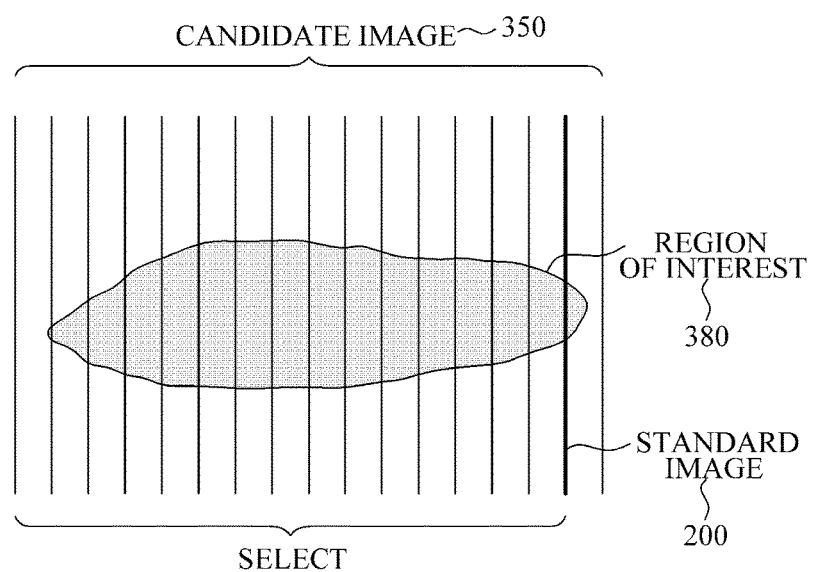
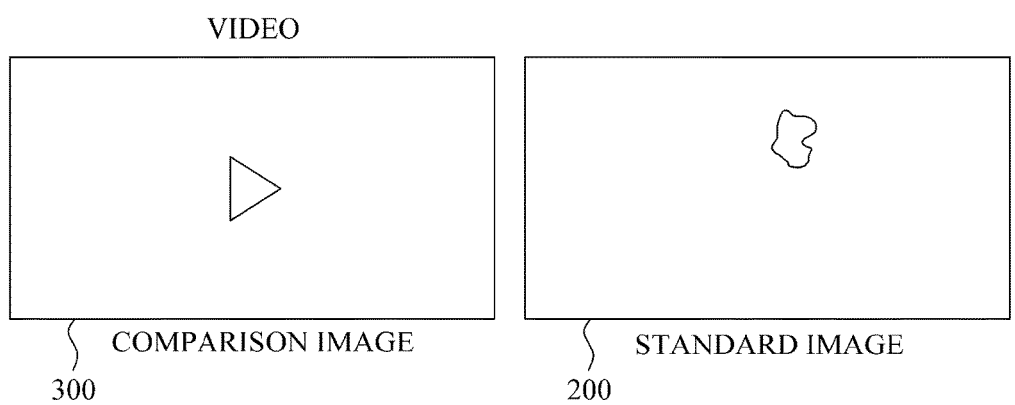

METHOD AND APPARATUS FOR SUPPORTING DIAGNOSIS OF REGION OF INTEREST BY PROVIDING COMPARISON IMAGE

CROSS-REFERENCE TO RELATED APPLICATION(S)

This application claims the benefit under 35 U.S.C. § 119(a) of Korean Patent Application No. 10-2014-0093584, filed on Jul. 23, 2014, in the Korean Intellectual Property Office, the entire disclosure of which is incorporated herein by reference for all purposes.

BACKGROUND

1. Field

The following description relates to method and an apparatus for supporting a diagnosis of a lesion by providing comparison images.

2. Description of Related Art

As an ultrasound imaging device does not have good resolution in comparison to other imaging devices, an ultrasound image captured by the ultrasound imaging device may visually differ from images captured by other imaging device due to differences in the characteristics of muscle and fat for each organ (i.e., breasts, liver, heart, etc.). Additionally, a tumor may be difficult to diagnose since the appearance of the tumor in the image may be similar to the appearance of muscle, fat, etc., in the image. To this end, if a suspicious area is generated, an examiner may consider a suspicious area as a Region of Interest (ROI) and may move a probe and check surrounding (spatial and temporal) images related to the suspicious area since one image cross section of an ultrasound image may not be clear enough to confirm a diagnosis.

Accordingly, Computer-Aided Diagnosis (CAD) that may detect a tumor in an ultrasound image in real time may mark a cross, a box, segmentation, or a dot, etc., in a detected single ultrasound image, thus informing a medical team of the tumor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, there is provided an apparatus for supporting a diagnosis of a Region of Interest (ROI), the apparatus including a standard image determiner configured to determine, as a standard image, an image where an ROI is detected among a plurality of images received from an image collecting device, a candidate image extractor configured to extract at least one candidate image to be one or more comparison images based on the determined standard image, a comparison image selector configured to select at least one comparison image for supporting a diagnosis of the ROI among the at least one candidate image, and an interface configured to provide a user with an output result of the standard image and the at least one selected comparison image.

The candidate image extractor may extract the at least one candidate image to be the at least one comparison image within a predetermined time around a moment in time when the determined standard image is acquired or a moment in time when the ROI is detected from the received image.

The candidate image extractor may extract the at least one candidate image based on a degree of similarity between the received images and the standard image.

The comparison image selector may select the at least one comparison image from among the at least one candidate image in at least one of a moment in time immediately before the ROI is detected, or a moment in time when the ROI is detected and a time from a moment in time when ROI is detected to a moment in time when its detection ends.

The comparison image selector may select the at least one comparison image based on a degree of comparison between the ROI of the standard image and corresponding areas of the at least one candidate image.

The comparison image selector may select the at least one comparison image based on a degree of similarity between a non-ROI of the standard image and corresponding areas of the at least one candidate image.

The comparison image selector may select the at least one comparison image based on a probability to be a lesion on corresponding areas of the at least one candidate image based on information of characteristics of the lesion.

The comparison image selector may select the at least one comparison image which are video images made from the candidate images within a predetermined time.

The interface may output the standard image and the at least one comparison image by using an arrangement in combination of a single, front and rear, left and right, and upper and lower layout.

The interface may output the ROI of the standard image and the corresponding areas of the at least one comparison image by using a marker or changing a magnification.

The interface may further provide related information including at least one of a detection moment in time of the ROI, coordinates of the ROI, a degree of similarity between the standard image and the at least one comparison image, a degree of contrast between the ROIs, characteristics of a lesion, or a probability to be a lesion on the ROI.

In another aspect, there is provided a method of supporting a diagnosis of a Region of Interest (ROI), the method including determining, as a standard image, an image where an ROI is detected among a plurality of images received from an image collecting device, extracting at least one candidate image to be at least one comparison image based on the determined standard image, selecting at least one comparison image among the at least one candidate image to support a diagnosis of the ROI, and providing a user with an output result of the standard image and the at least one selected comparison image.

The method of extracting of the at least one candidate image may include extracting the at least one candidate image to be at least one comparison image within a predetermined time around a moment in time when the determined standard image is acquired or a moment in time when the ROI is detected from the received image.

The method extracting of the at least one candidate image may include extracting the at least one candidate image based on a degree of similarity between the received images and the standard image.

The method of selecting of the at least one comparison image may include selecting the at least one comparison image from among the candidate images in at least one of a moment in time immediately before the ROI is detected, or a moment in time when the ROI is detected and a time from a moment in time when ROI is detected to a moment in time when its detection ends.

The method of selecting of the at least one comparison image may include selecting the at least one comparison image based on a degree of comparison between the ROI of the standard image and corresponding areas of the at least one candidate image.

The method of selecting of the at least one comparison image may include selecting the at least one comparison image based on a probability to be lesion on corresponding areas of the at least one candidate image based on information of characteristics of the lesion.

The method of providing of the output result may include outputting the standard image and the at least one comparison image by using an arrangement in combination of a single, front and rear, left and right and upper and lower layout.

The method of providing of the output result may include outputting the ROI of the standard image and the corresponding area of the comparison images by using a marker or changing a magnification.

The method of providing of the output result may further include providing related information including at least one of a detection moment in time of the ROI, coordinates of the ROI, a degree of similarity between the standard image and the at least one comparison image, a degree of contrast between the ROIs, characteristics of a lesion, or a probability to be a lesion on the ROI.

There is also provided a non-transitory computer-readable medium storing program instructions for controlling a processor to perform the method of supporting a diagnosis of a ROI.

Still further, there is provided a method of supporting a diagnosis of a Region of Interest (ROI), the method including determining a standard image from among a plurality of images received from an image collecting device, extracting at least one candidate image from among a plurality of images to be at least one comparison image, providing a user with an output result of the standard image and the at least one comparison image.

The method of extracting of the at least one candidate images may include extracting the at least one candidate image to be at least one comparison image within a predetermined time around a moment in time when the determined standard image is acquired or a moment in time when the ROI is detected from the received image.

The method of extracting of the at least one candidate image may include extracting the at least one candidate image based on a degree of similarity between the received images and the standard image.

The method of calculating the degree of similarity may be based on a comparison between features extracted from the standard image with features extracted in the image received from the image collecting device.

Other features and aspects will be apparent from the following detailed description, the drawings, and the claims.

BRIEF DESCRIPTION OF THE DRAWINGS

FIG. 5 is a diagram illustrating an aspect of a probability of a region to be a lesion on an ROI.

FIG. 7 is a diagram illustrating an aspect of selecting comparison images which are video images made from candidate images.

Figure 1:
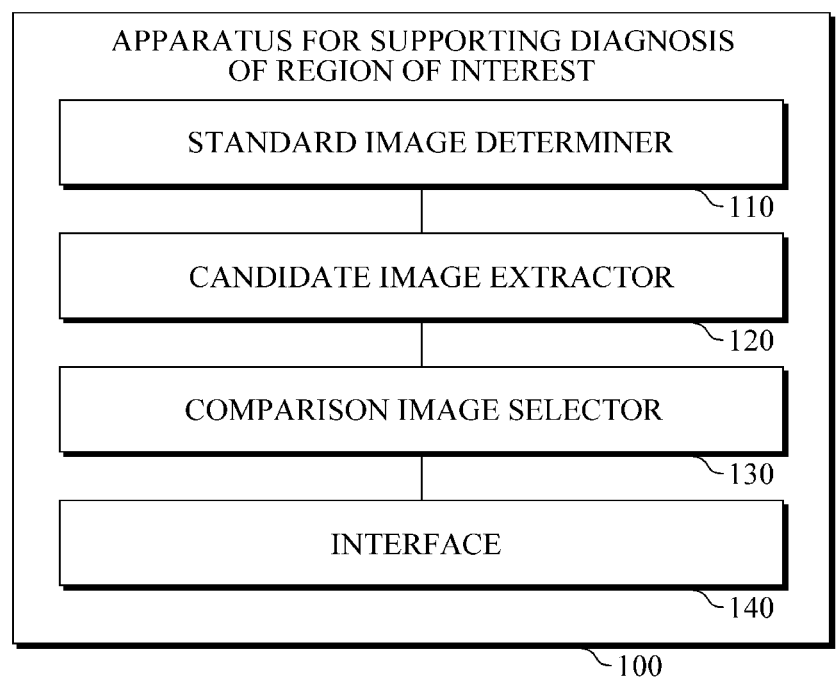
FIG. 1 is a diagram illustrating an apparatus for supporting a diagnosis of a Region of Interest (ROI) by providing comparison images according to an aspect.

Throughout the drawings and the detailed description, unless otherwise described, the same drawing reference numerals will be understood to refer to the same elements, features, and structures. The drawings may not be to scale, and the relative size, proportion, and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art may be omitted for increased clarity and conciseness.

The features described herein may be embodied in different forms, and are not to be construed as being limited to the examples described. Hereinafter, aspects for an apparatus and method for supporting a diagnosis of a Region of Interest (ROI) by providing a comparison image are described specifically with reference to figures. In this context, supporting a diagnosis of an ROI may include but is not limited to the identification of the nature of an illness or other problem by examination of the symptoms FIG. 1 is a diagram illustrating an apparatus for supporting a diagnosis of a ROI by providing a comparison image according to an aspect.

Generally, a Computer-Aided Diagnosis (CAD) system may provide support to a doctor during a diagnosis of an image by processing, with a computer, a presence/absence of a lesion (tumor) or other malignant features, a size of the lesion, and a location of the lesion, etc., within a medical image so as to detect the lesion and to provide the detection result to the doctor for diagnosis.

However, since an ultrasound image does not have good resolution quality, there are some cases where a detection of the presence/absence or the location of a lesion with only a single image, in which an ROI is included, is difficult. To solve such these problems, a comparison image may be provided so as to cross-check whether the ROI included in the standard image may be considered a lesion.

In an aspect, an apparatus 100 for supporting a diagnosis of an ROI includes a standard image determiner 110, a candidate image extractor 120, a comparison image selector 130, and an interface 140.

In an aspect, among images received from an image collecting device (not shown), the standard image determiner 110 may determine, as a standard image, an image where the ROI is detected. The standard image determiner 110 may receive a plurality of images from the image collecting device from a moment in time in which a detection of the ROI begins to a moment in time in which the detection of the ROI ends. From the initial detection of the ROI to the final detection of the ROI, the standard image determiner 110 may determine that one image from the plurality of images may be set as a standard image. Here, the CAD system may automatically detect a suspicious abnormality as an ROI. For example, in detecting the suspicious abnormality, the standard image determiner 110 may detect a shadow of an unusual mass indicating a presence of a cancer, a lesion, etc., or a shadow of high-concentration micro-calcifications by applying various parameters for analyzing images. Micro-calcifications may refer to tiny specks of mineral deposits such as calcium, which occur in clusters within a human body or can be scattered throughout the mammary gland or prostate. However, since there may be various examples of detecting a standard image, the present disclosure does not need to be limited thereto.

The candidate image extractor 120 may extract one or more candidate images with regard to the standard image. In one aspect, the candidate image extractor 120 may extract candidate images with respect to a determined standard image within a predetermined time around a moment in time in which the standard image is acquired. In particular, the candidate image extractor 120 may extract candidate images during a predetermined time around the acquisition of the acquired standard image. For example, the candidate images may be extracted from images which are obtained around the acquired standard image from a few seconds before the standard image is acquired to a few seconds after the standard image is acquired.

In another aspect, the candidate image extractor 120 may extract a candidate image among images received from an image collecting device within a predetermined time around a moment in time in which an ROI is detected. To this end, the candidate image may be extracted in real time according to the images received in real time from the image collecting device. For example, in response to changes in time, there is a moment in time that detects an ROI in the received image from the image collecting device, whose previous image didn't include an ROI. In other words, in response to changes in images over a period of time, detection of an ROI in a received image from the image collecting device may occur where in the previous moment in time, detection of an ROI in a received image may not have occurred.

The candidate image extractor 120 may extract a candidate image to be a comparison image within a predetermined time from a moment in time before the ROI is detected to a moment in time after detection of the ROI ends based on a moment in time when the ROI is detected from the received image. Indeed, the candidate image extractor 120 may extract a candidate image to be a comparison image at a predetermined time prior to detection of the ROI or at a predetermined time after completion of the detected ROI. Here, the predetermined time may been set in advance with reference to the number of images acquired per second or set in advance with reference to preset time period In another aspect, the candidate image extractor 120 may extract a candidate image based on a degree of similarity between received images and a standard image. The CAD system may determine the degree of similarity between the standard image and the received image. Here, the degree of similarity may be calculated by extracting features from the standard image, and by comparing, with a degree of conformity, whether extracted features corresponding to the standard image are in the images received from the image collecting device. If the extracted features corresponding to the standard image are in the received images, conformity between features is calculated. For example, if the image received from the image collecting device is acquired at a position far from an ROI of the standard image, a degree of similarity between the image received from the image collecting device and the standard image may be prominently less than an expected threshold. To exclude such a case, the candidate image extractor 120 may extract the candidate image with similarity of more than a predetermined threshold. Since the predetermined threshold may be set differently according to need, the present disclosure is not limited thereto. For example, in a case in which a user wants to set a range of the candidate image to be broad, the user may request similarity of more than 50%, or may extract a candidate image with similarity of more than 90% so as to acquire candidate images' group that matches closely with the standard image. Alternatively, in a case in which a user wants to set a range of the candidate image to be narrow, the user may request similarity of less than 50%, or may extract a candidate image with similarity of less than 10% so as to acquire candidate images' group that matches closely with the standard image. In other words, the threshold range in which the candidate image may be similar to the standard image may be dependent on a necessity of candidate image to be sufficiently similar to the standard image. Examples of determining the similarity are described with reference to FIG. 2, as discussed below.

The comparison image selector 130 may select one or more comparison images among the candidate images to support a diagnosis of the ROI. Supporting a diagnosis of the ROI includes the identification and detection of a shadow of an unusual mass indicating a presence of a cancer, a lesion, etc., or a shadow of high-concentration micro-calcifications. In an aspect, the comparison image selector 130 may select, from the candidate image, a specific moment in time, such as a moment in time immediately before the ROI is detected or a moment in time when the ROI is detected. The comparison image selector 130 may select the comparison image on a time from a moment in time when ROI is detected to, or a time from a moment in time when ROI is detected to a moment in time when detection of the ROI ends. The comparison image selector 130 may select one moment in time within a range of a series of continuous time from a moment in time when the ROI is detected to a moment in time when detection of the ROI ends. Since there are various examples related thereto, the present disclosure may not be limited thereto. Examples of selecting a plurality of comparison images at a predetermined time interval during the time from a moment in time when the ROI is detected to a moment in time when detection of the ROI ends are described with reference to FIG. 6, as discussed below.

The comparison image selector 130 may select the comparison image based on a degree of comparison between the ROI of the standard image and an associated area of a candidate image. The associated area of the candidate image may refer to a specified area that would help in the diagnosis of the ultrasound image by a medical team. A specified area of the candidate image may be extracted as the area that corresponds to the ROI of the standard image even though the ROI has not been yet been extracted from the candidate image. For example, the comparison selector 130 may calculate coordinates of the specified area of the candidate image, wherein the specified area is associated with the ROI of the standard image, by extracting feature points from the standard image and feature points from the candidate image, and comparing those feature points. Feature points may refer to a distinctive attribute or aspect, such as color, size, shape, or density, important in detecting a shadow of an unusual mass, a lesion, etc., or a shadow of high-concentration micro-calcifications. At this time, the degree of comparison between the ROI of the standard image and the associated area of the candidate image may be calculated by a comparison of at least one or more of: coordinates, a shape, a size, a form, a texture, a shadow, attributes, and a correlation to surrounding images. As a result of the comparison, the difference in the image from the ROI from the standard image indicates the similarity between the image and the ROI of the standard image. In other words, the comparison between the ROI of the standard image and the associated area of the candidate image may indicates either a high degree of similarity between the image and the ROI of the standard image or a low degree of similarity between the image and the ROI of the standard image. The calculated degree of the comparison may be used in the selection of the comparison image as needed. For example, an image with a high degree of similarity may be selected as the comparison image to show similarity from the ROI of the standard image or an image with the low degree of similarity may be selected as the comparison image to show dissimilarity from the ROI of the standard image. Examples related thereto are described with reference to FIGS. 3 and 4, as discussed below.

The comparison image selector 130 may select a comparison image based on a degree of similarity between a non-ROI of the standard image and an associated area of the candidate image. For example, while extracting feature points from the standard image and the candidate image, the comparison image selector 130 may select the comparison image with a high degree of similarity by comparing feature points in specified areas except for feature points at the ROI of the standard image and feature points at the corresponding area of the candidate image. In such cases, while the standard image and the candidate image may have similar characteristic components because the standard image and the candidate image are captured at a similar angle, direction, and moment in time, the standard image and the candidate image may differ from each other only with respect to the ROI. Hence, selecting a comparison image based on a degree of similarity between a non-ROI of the standard image and an associated area of the candidate image may capture this attribute.

The comparison image selector 130 may select a comparison image in consideration of a probability of a lesion to be on the corresponding area of the candidate images according to information of characteristics of the lesion. The apparatus 100 may store in advance information related to the characteristics of the lesion. The information of the characteristics of the lesion may include data related to an image, such as a shape, a size, a form, a texture, a shadow, attributes, and a correlation to surrounding images; data according to a type, such as a benign or malignant tumor; and data according to statistics, such as a lesion's pattern and sample as well as other characteristics of the lesion. For example, the comparison image selector 130 may select the comparison image with the highest probability that a lesion is on a candidate image among the candidate images according to a size of a cross section of the detected ROI. Examples related thereto are described with reference to FIG. 5, as discussed below.

The comparison image selector 130 may select a comparison image which are video images derived from the candidate images. Herein, the video images are derived within predetermined time around a moment in time when the ROI has been extracted from the candidate image. Examples related thereto are described with reference to FIG. 7, as discussed below.

An interface 140 may provide an output result of the standard image and the selected comparison image. The interface 140 may output the standard images and the comparison images by utilizing at least one arrangements or combinations of a single, front and rear, left and right, and upper and lower layout. For example, the interface 140 may solely output one selected comparison image, or output a plurality of the comparison images by utilizing a left and right arrangement. The interface 140 may arrange the standard image on the right, and the comparison image on the left. In a case in which a plurality of comparison images are selected, the interface 140 may arrange the plurality of the comparison images in order at the bottom of the outputted result. Examples related thereto are described with reference to FIG. 10, as discussed below.

The interface 140 may output the standard image and the comparison image at the same time. In a case of an ultrasound image, images received to an image collecting device are changed in real time depending on a probe movement. Here, the interface 140 may output images received from an image collecting device, the standard image, and the comparison image together in order to compare the three images with each other.

The interface 140 may output the ROI of the standard image and the associated area of the comparison image by utilizing a marker or by changing a magnification. For example, the interface 140 may check the ROI of the standard image in detail by outputting the associated area of the comparison image composing high magnification. Additionally, the interface 140 may output the associated area, which corresponds to the ROI of the standard image, of the comparison image composing low magnification to identify a rough location of the ROI in the standard image.

In another aspect, the interface 140 may output related information on the ROI, such as a detection moment in time of the ROI, coordinates of the ROI, a degree of similarity between the standard image and the comparison image, a degree of contrast between the ROIs, characteristics of a lesion, a probability to be lesion on the ROI.

In yet another aspect, the interface 140 may provide an option for changing an arrangement of the output of the standard image and the comparison image, and may provide an option for selecting a representative comparison image from among the plurality of the selected comparison images. Since there are various standards for selecting the comparison image, as mentioned above, the interface 140 may receive an input of a standard for selecting the comparison image. In a case in which there is a plurality of standards for selecting the comparison image, the interface 140 may give weight to a specific standard from among the plurality of the standards to reflect the weight in selecting the comparison image. In other words, the interface 140 may give weight to a specific standard from among the plurality of the standards in selecting the comparison image. If the comparison image is selected, the selected comparison image may be stored with the standard image.

Figure 2:
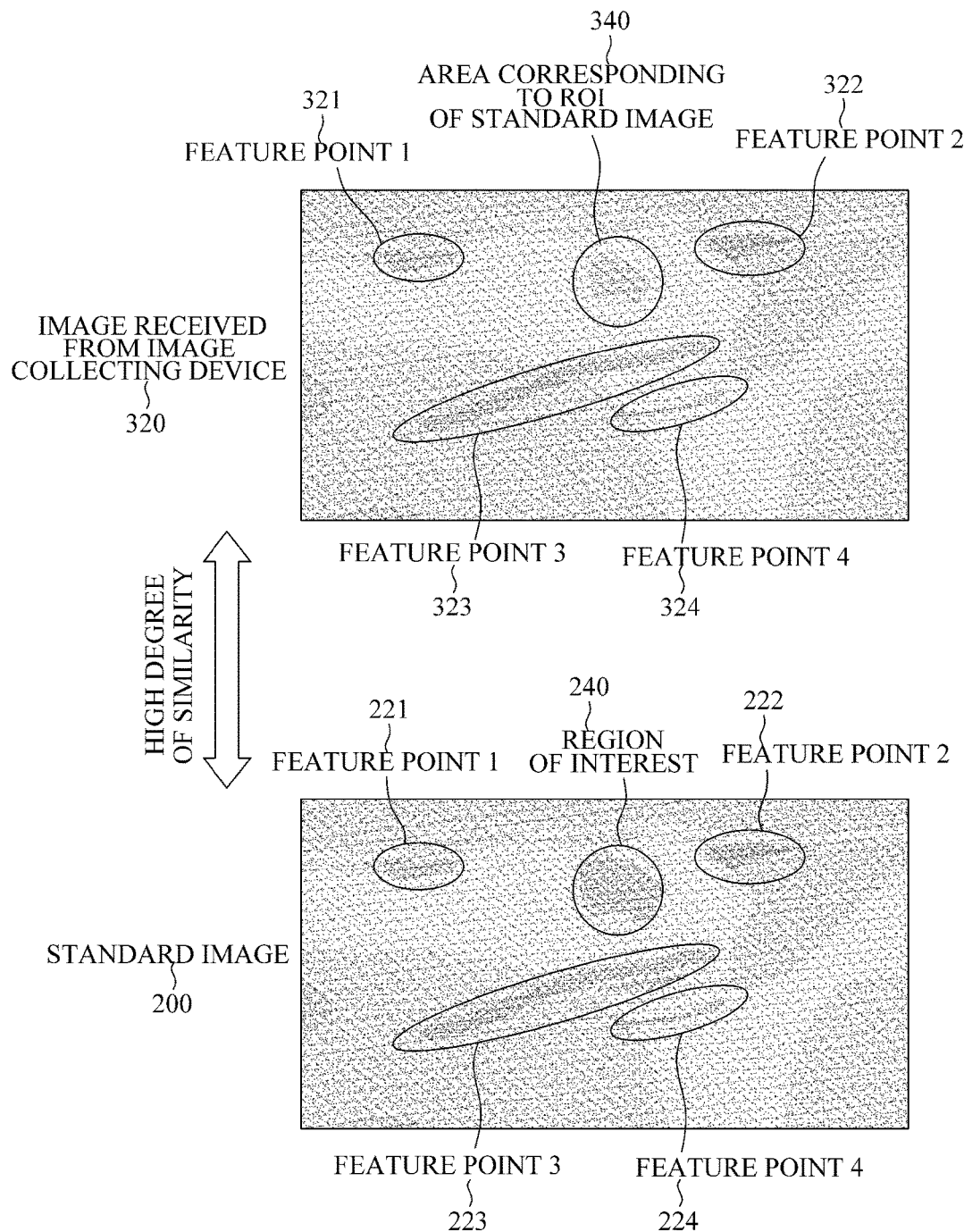
FIG. 2 is a diagram illustrating an aspect of calculating a degree of similarity between received images and a standard image.

FIG. 2 is a diagram illustrating an aspect of calculating a degree of similarity between a received image and a standard image. Referring to FIG. 2, feature point 1 221, feature point 2 222, feature point 3 223, and feature point 4 224 are extracted from the standard image 200. The feature point 1 221 and feature point 2 222 have characteristics of an oval type and may be seen as darker than surrounding area because of a darker shadow, and the feature point 3 223 has characteristics of long black diagonal stripes. The feature point 4 224 has characteristics of long white horizontal stripes due to shadings which are lighter than surrounding area.

If the standard image 200 is compared to an image received from an image collecting device 300, feature point 1 321, feature point 2 322, feature point 3 333, and feature point 4 324 are also extracted from the received image. Feature point 1 321, feature point 2 322, feature point 3 333, and feature point 4 24 are respectively the same as the characteristics of feature point 1 221, feature point 2 222, feature point 3 223, and feature point 4 224 shown in the standard image 200. Each of the feature point 1 321 and feature point 2 322 has a black oval dot. The feature point 3 323 has long black horizontal stripes, and the feature point 4 324 has long white horizontal stripes. However, the image received from the image collecting device 300 may be different from the area that corresponds to an ROI of a standard image 340 as compared to the ROI 240 of the standard image 200 in so far as the area that corresponds to an ROI 340 of the image received from the image collecting device 300 is different that the ROI 240 of a standard image 200. Nonetheless, feature point 1 221, feature point 2 222, feature point 3 223, and feature point 4 224 of the standard image 200 are respectively the same as feature point 1 321, feature point 2 322, feature point 3 323, and feature point 4 324 of the image received from the image collecting device 300. Nonetheless, since such case shows a high degree of conformity overall, a high degree of similarity may also be calculated. By using such a result, a candidate image may be extracted with respect to an image with a high degree of similarity to the standard image. However, this is only one example, and the present disclosure is not limited thereto.

Figure 3:
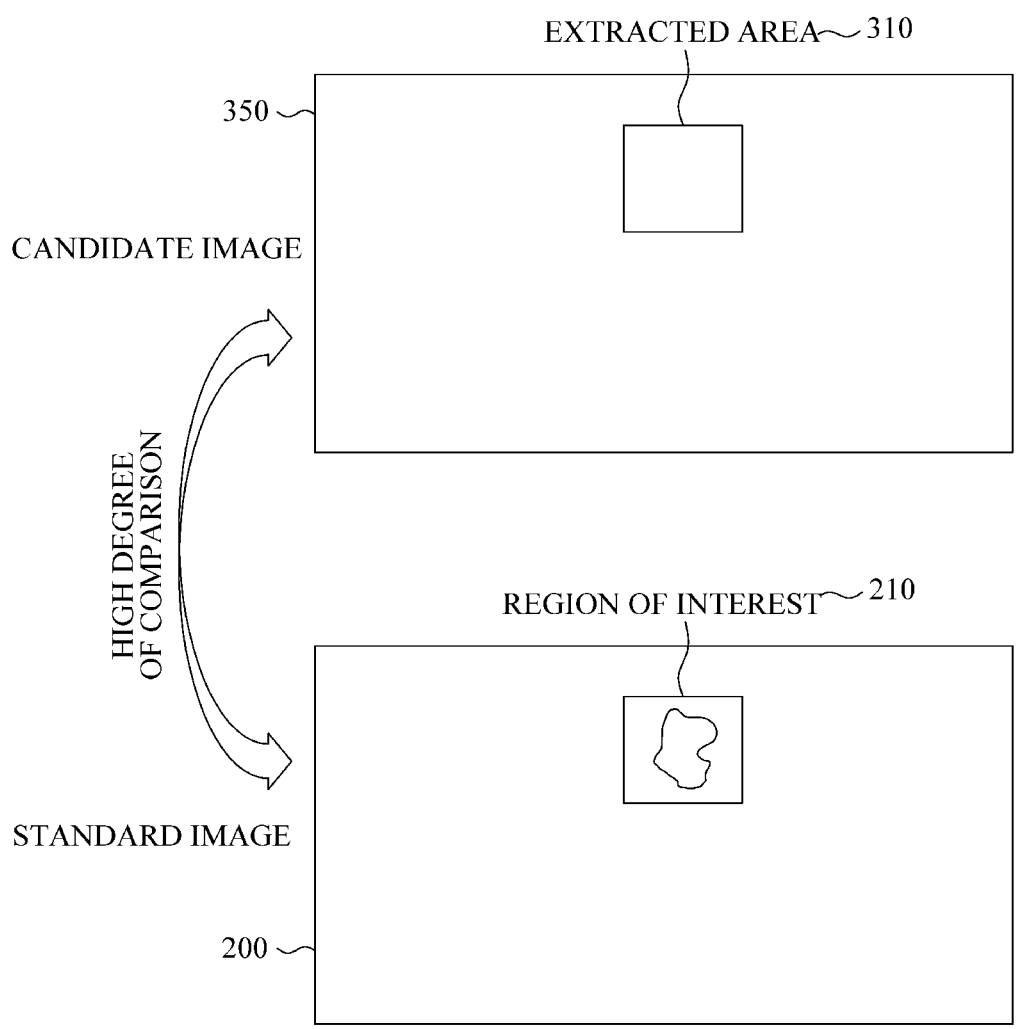
FIG. 3 is a diagram illustrating an aspect of calculating a degree of contrast between an ROI of a standard image and the corresponding area of a candidate image.

FIG. 3 is a diagram illustrating an aspect of calculating a degree of comparison between an ROI of a standard image and a specified area of a candidate image, wherein the specified area corresponds to the ROI of the standard image. Referring to FIG. 3, an apparatus for supporting a diagnosis of an ROI may extract, from a candidate image 350, an extracted area 310 that corresponds to the ROI 210 of the standard image 200. Then, a degree of similarity based on the comparison between the extracted area 310 of the candidate image 350 and the ROI 210 of the standard image 200 is calculated. There may be various standards for calculating the degree of similarity. Here, the degree of similarity may be calculated by comparing at least one or more of: coordinates, a shape, a size, a form, a texture, a shadow, attributes, and relation between surrounding images of the extracted area 310 of the candidate image 350 and the ROI 210 of the standard image 200. The candidate image 350 in FIG. 3 is an image in a moment in time immediately before the ROI 210 of the standard image 200 is detected. The ROI 210 of the standard image 200 may be an area that include sections around an area suspected to be a lesion.

Referring to FIG. 3, in the extracted area 310 of the candidate image 350, the area suspected to be a lesion of the same form as the ROI 210 of the standard image 200 may be discovered. Thus, from the ROI 210 of the standard image 200 and an area of the candidate image 350, wherein the area corresponds to the ROI 210 of the standard image 200, a high degree of similarity may be calculated with respect to a shape and a size of the ROI 210. However, this is a rough comparison, and an apparatus for supporting a diagnosis of an ROI may compare the ROI 210 of the standard image 200 and the extracted area 310 of the candidate image 350 with respect to subtle differences, such as the shadow, attributes of a lesion, and a texture, etc., to further calculate the degree of similarity. In other words, the apparatus for supporting the diagnosis of the ROI may be dependent on whether the area suspected to be the lesion of the same form as the ROI 210 exists or does not exist. The apparatus for supporting the diagnosis of the ROI may also be dependent on subtle differences, such as the shadow, attributes of a lesion, and a texture, etc., of the extracted area 310 of the candidate image 350 if the lesion does exist.

Figure 4:
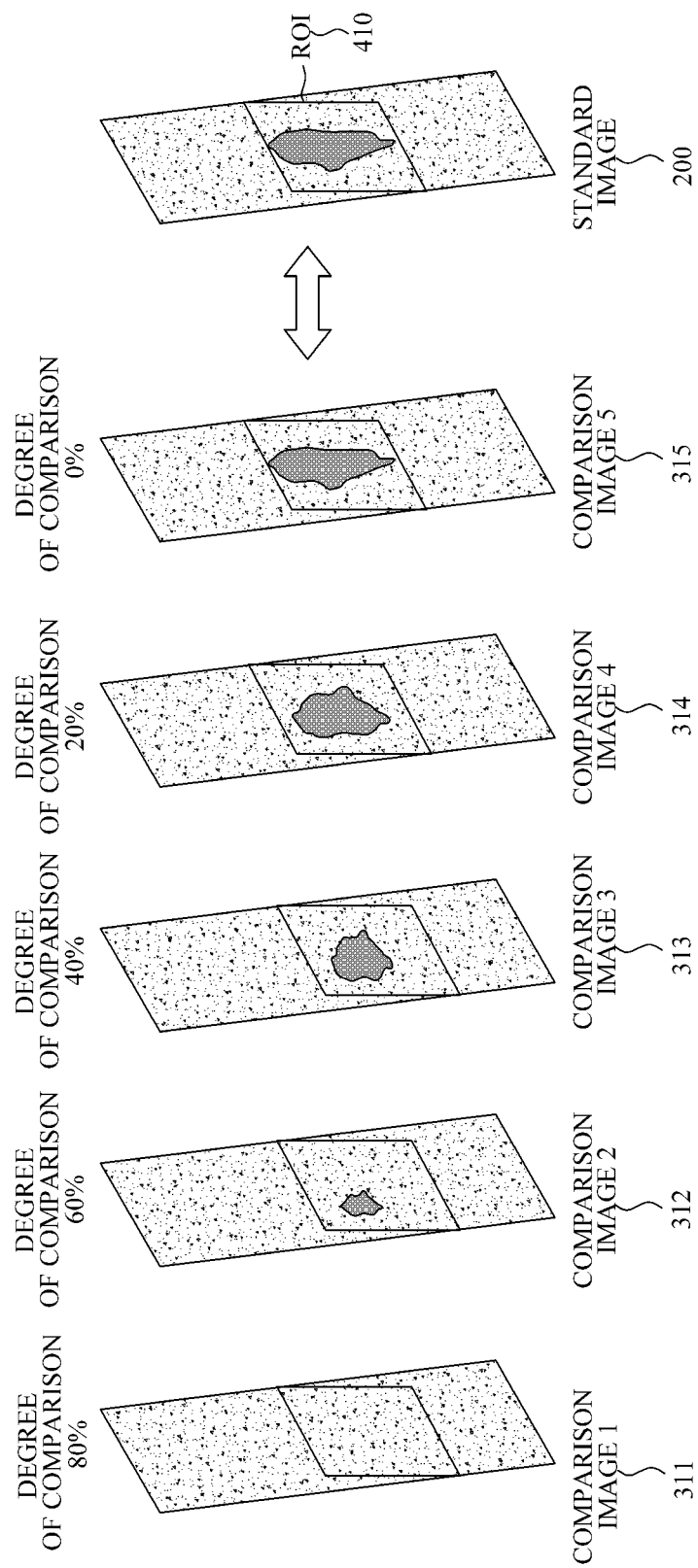
FIG. 4 is a diagram illustrating an aspect of selecting a comparison image based on a degree of contrast.

FIG. 4 is a diagram illustrating an aspect of selecting a comparison image based on a degree of comparison. As a probe moves gradually from one candidate image to another candidate image, a size of a cross section of the ROI gets bigger since the center of the ROI increases. On the basis of a standard image 200, the degree of comparison of a comparison image 315 is 0%. An apparatus for supporting a diagnosis of the ROI 410 may set a certain standard in advance with respect to the degree of comparison, and may select, as a comparison image, an image that shows a gap of the degree of comparison at 20%, for example, for the ROI 410, as illustrated in FIG. 4.

In such a case, a comparison image 1 311, which is an image immediately before the ROI 410 is detected from a candidate image, has the degree of comparison of 80% and may not be selected as the comparison image. Regarding the comparison image 2 312, even though the ROI 410 is detected from a comparison image 2 312, the comparison image 2 312 has the degree of comparison of 60% because of its small cross section may not be selected as the comparison image. Regarding a comparison image 3 313 that has a cross section of a size that is a little bigger than the comparison image 2 312 and has the degree of comparison of 40% in comparison with the ROI 410 of the standard image, comparison image 3 313 may still not be selected as the comparison image. However, a comparison image 4 314 that has a cross section of the ROI 410 of a size that is a little bigger than the comparison image 3 313, and has the degree of comparison of 20% may be selected as the comparison image. Additionally, a comparison image 5 315 that has the degree of comparison of 0% because of the same shape, size, and form as the ROI 410 of the standard image may be selected as the comparison image. It should be noted that the degree of comparison which may be set in advance may be greater than or less than 20% such that comparison image 3 313 with a degree of comparison of 40% in comparison with the ROI 410 of the standard image may be selected as the comparison image if the degree of comparison is set to 40%.

Likewise, a plurality of images may be selected as a comparison image 300 according to a degree of comparison, and in such a case, a changing aspect of the cross section may be compared to be shown through the comparison image 300. Also, an apparatus for supporting a diagnosis of the ROI may acquire a reception moment in time and coordinate information of the selected comparison image 300 to use them in measuring an overall size and form of the ROI.

FIG. 5 is a diagram illustrating an aspect of a probability of a detected ROI to be a lesion. The apparatus 100 for supporting a diagnosis of an ROI may calculate the probability of the detected ROI to be a lesion. To this end, the apparatus 100 may store information related to characteristics of the lesion in advance. The characteristics of the lesion may be different according to the content of a lesion that the apparatus 100 aims to detect. For example, a type and characteristics of the lesion that is detectable may be different according to which part of a body an ultrasound imaging device is examining. However, in general, information of the characteristics of the lesion may include data related to an image, such as a shape, a size, brightness, a texture, and a correlation to surrounding images; data according to a type, such as a benign or malignant tumor; and data according to statistics, such as a lesion's pattern and sample as well as other characteristics of the lesion. If the lesion is determined to be a tumor, the lesion may be shown as having a different shape, size, and pattern, etc., from another organ, muscle, fat, fiber, and compounds of calcium in a body. For example, if the exceptionally large shading compared to a size of fat or fiber is detected as the ROI, the apparatus 100 may compare its size, brightness, and texture, which are characteristics that the lesion may have, to calculate a high probability of it being a lesion.

Referring to FIG. 5, an ROI suspected to be a lesion 360 is detected from a candidate image 350. Here, an ROI with the biggest cross section is detected from a comparison image 1 311. Since a comparison image 2 312 is at a moment in time when the detection of the ROI from the candidate image 350 ends, the ROI with a cross section of a relatively small size is detected. Thus, in comparison to the lesion's shape, size, and brightness, etc., which are stored in advance, the comparison image 1 311 has a relatively higher probability to be a lesion than the comparison 2 312. If the cross section of the comparison image 1 311 is exceptionally large in comparison to other parts of a body, which are considered as being generally normal, a probability to be a lesion may be very high. Thus, an apparatus for supporting a diagnosis of an ROI may extract an area that corresponds to the ROI of the standard image from the candidate image 350, and may select an image with a high probability being a lesion as a comparison image in consideration of a probability of the extracted area to be a lesion. However, since this is only one example, there may be various standards for calculating a probability being the lesion 360.

Figure 6:
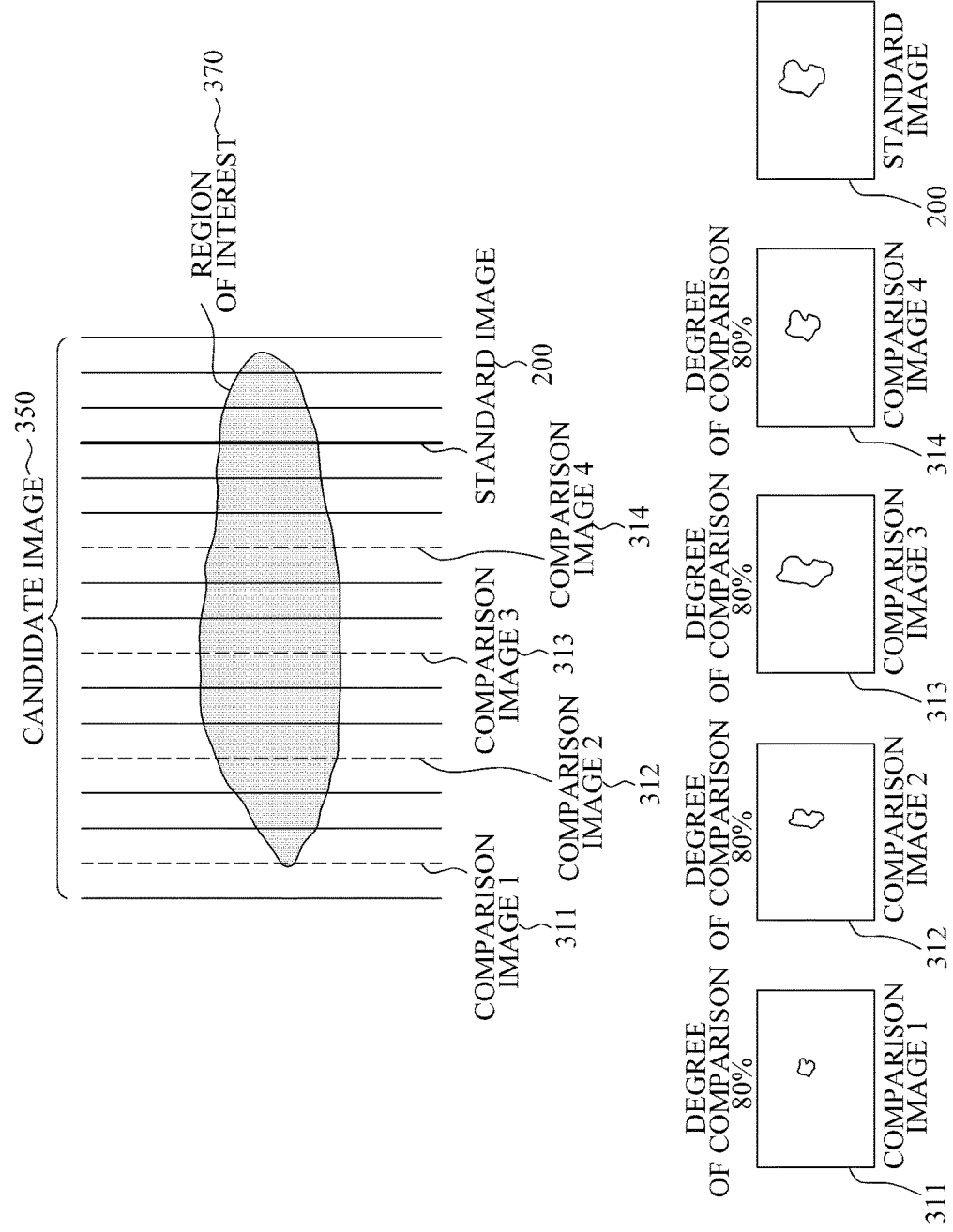
FIG. 6 is a diagram illustrating an aspect of selecting a plurality of comparison images at a predetermined time interval.

FIG. 6 is a diagram illustrating an aspect of selecting a plurality of comparison images at a predetermined time interval. There are various examples of selecting a comparison image in accordance with time. For example, a comparison image may be selected from a candidate image in accordance with a specific moment in time. First, in a case in which the comparison image is selected at a moment in time immediately before an ROI is detected from the candidate image, an image with a high degree of comparison to an area of the candidate image, wherein the area corresponds to the ROI of a standard image, may be proposed as the comparison image. In a case in which the comparison image is selected at a moment in time when the ROI begins to be detected, a moment in time before or after the ROI is detected may be used in calculating coordinates of the ROI.

Also, a plurality of comparison images may be selected at a predetermined time interval, which is described with reference to FIG. 6, as discussed below. Referring to FIG. 6, each cross-section image is being received during a predetermined time existing around a moment in time when the ROI 370 is detected from a candidate image 350. Here, the predetermined time may indicate a time existing from a few seconds before the ROI 370 is detected from the candidate image 350 to a few seconds after the detection of the ROI 370 ends.

In an aspect of FIG. 6, an apparatus 100 for supporting a diagnosis of an ROI may select four images from a candidate image with respect to the time from a moment in time when the ROI is detected to a moment in time when a standard image is acquired. Here, a degree of comparison between an area of the comparison image, wherein the area corresponds to the standard image, and the ROI 370 of the standard image is 80% in a comparison image 1 311, 50% in a comparison image 2 312, 10% in a comparison image 3 313, and 15% in a comparison image 4 314. In accordance with the cross sections of the comparison image 3 313 and the comparison image 4 314, the cross section grows bigger and then smaller. Accordingly, the degree of comparison is reversed from 10% in the comparison image 3 313 to 15% in the comparison image 4 314. In other words, the cross section of the ROI 370 grows bigger at a moment in time when the comparison image 3 313 is acquired, and then grows smaller gradually. Thus, a changing aspect according to the time in the comparison images may be compared to the standard image to be seen.

FIG. 7 is a diagram illustrating an aspect of selecting comparison images which are video images made from the candidate images within a predetermined time. The video can easily show a flow of visual changes compared to a cross-section image. Referring to FIG. 7, images may be made into a video, which are received from an image collecting device during a predetermined time from a moment in time before an ROI 380 is detected from a candidate image 350 to a moment in time when a standard image 200 is acquired. A play button is displayed on a comparison image 300, and when a user clicks the play button, the comparison images may be played, which have been selected with respect to a predetermined time. In such a case, a dynamic flow of the ROI 380 may be shown in the comparison image 300 in comparison with a standard image 200.

Figure 8:
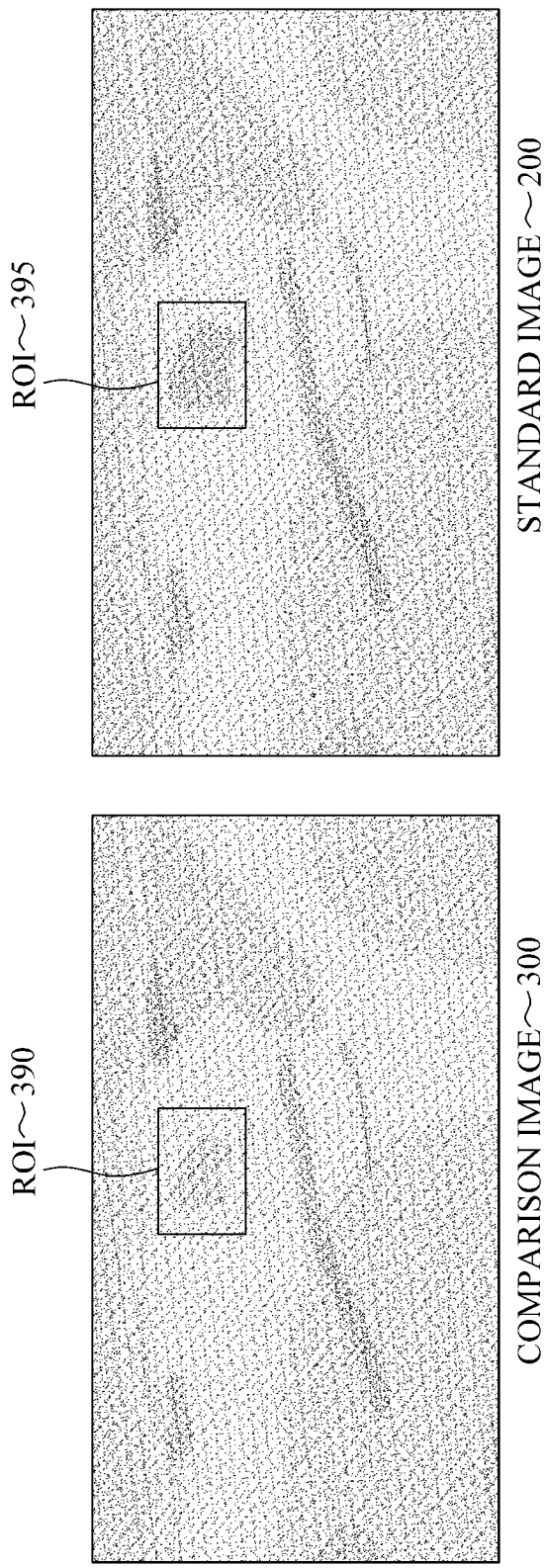
FIG. 8 is a diagram illustrating an aspect of outputting a standard image and a comparison image using an ultrasound imaging device.

FIG. 8 is a diagram illustrating an aspect of outputting a standard image and a comparison image by using an ultrasound imaging device. A comparison image 300 with an ROI selected by an apparatus for supporting a diagnosis may be output at the same time with a standard image 200. Referring to FIG. 8, the standard image 200 is arranged on the right, and the comparison image 300 is arranged on the left. The arrangement structure may be changed so that the standard image 200 is arranged on the left and the comparison image 300 is arranged on the right. In addition, in an aspect of FIG. 8, a box is displayed on an area that is extracted to correspond to the ROI 390 of the standard image and the ROI 395 of the comparison image. Such a box may help the comparison between the ROIs to be easy. Although other aspects are not illustrated through figures, the standard image and the comparison image may be output using at least one or more arrangements of a front and rear, up and down, or upper and lower layout. Other arrangement structures that are in a level those skilled in the art can readily think may be inferred.

Figure 9:
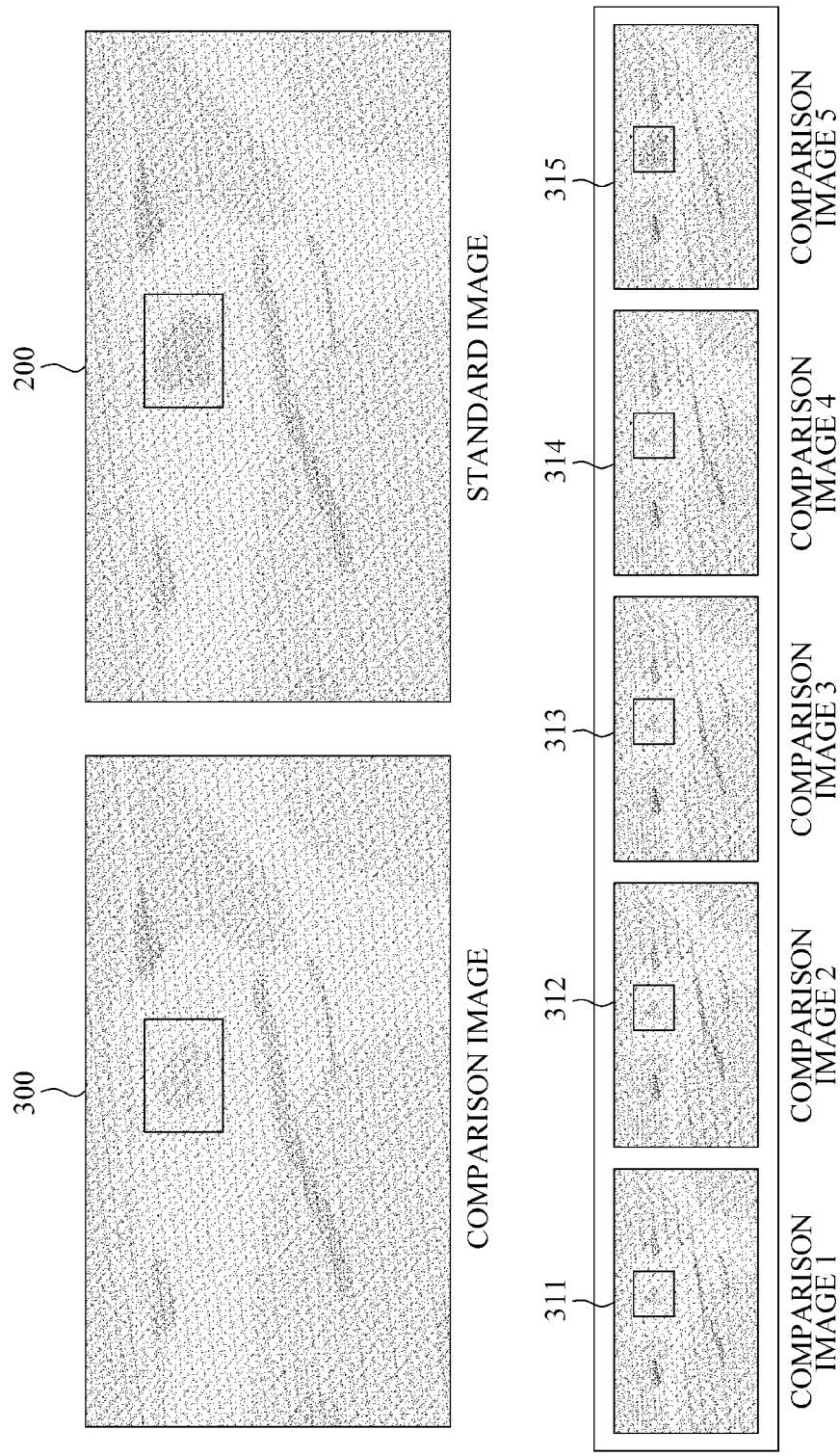
FIG. 9 is a diagram illustrating an aspect of outputting a plurality of selected comparison images.

FIG. 9 is a diagram illustrating an aspect of outputting a plurality of selected comparison images. Referring to FIGS. 4 and 6, an apparatus for supporting a diagnosis of an ROI may select a plurality of comparison images. Also, the apparatus is capable of outputting the plurality of comparison images at the same time. Accordingly, referring to FIG. 9, a standard image 200 may be arranged at the top on the right; a comparison image 300, at the top on the left; and comparison image 1 311, comparison image 2 312, comparison image 3 313, comparison image 4 314, and comparison image 5 315, at the bottom in order. The comparison image 300 may be a representative comparison image of the plurality of comparison images.

Figure 10:
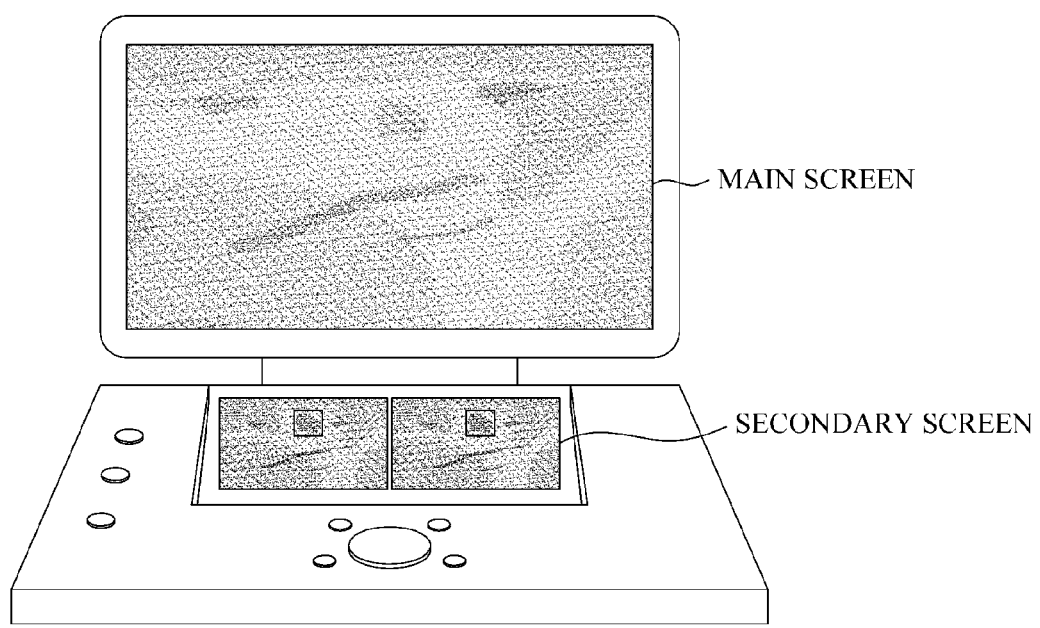
FIG. 10 is a diagram illustrating an aspect of outputting a standard image and a comparison image using a main screen and a secondary screen.

FIG. 10 is a diagram illustrating an aspect of outputting a standard image and a comparison image by using a main screen and a secondary screen. Referring to FIG. 10, an image received from an ultrasound image collecting device is output on a main screen, and the standard image and the comparison image are output on a secondary screen by an apparatus for supporting a diagnosis of an ROI. Accordingly, a user may observe surroundings of the ROI on the main screen, and may acquire additional information on the ROI from the standard image and the comparison image on the secondary screen. As an image is received from an ultrasound image collecting device in real time, the apparatus may automatically select and output the standard image and the comparison image to the secondary screen. Since there may be various standards for selecting the comparison image, the standard for selecting the comparison image may be set in advance. It is certain that the standard image and the comparison image may be output on the main screen in the apparatus.

Figure 11:
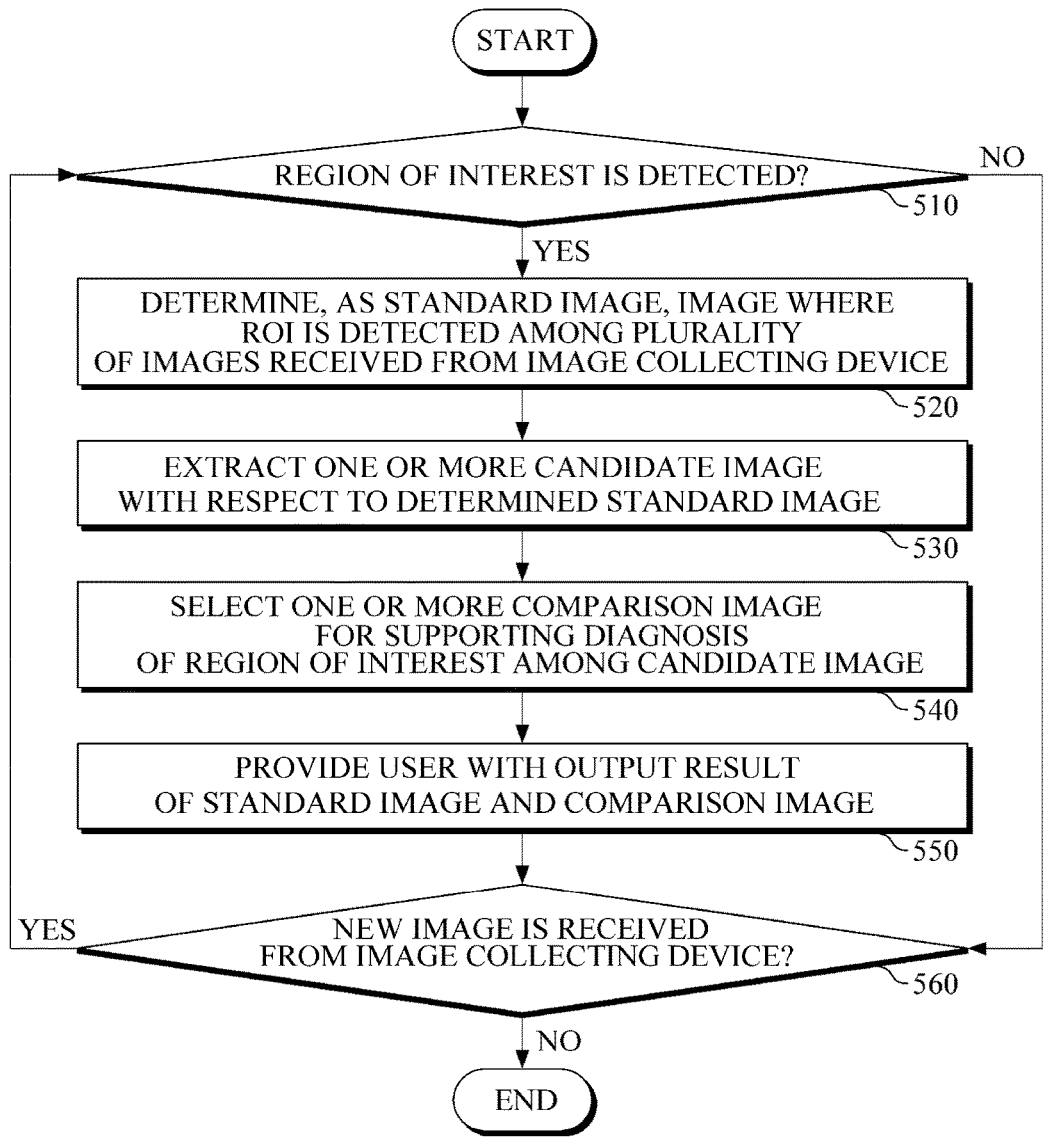
FIG. 11 is a flowchart illustrating a method of supporting a diagnosis of an ROI.

FIG. 11 is a flowchart illustrating a method of supporting a diagnosis of the ROI. Referring to FIG. 11, a method of supporting a diagnosis of the ROI is described below, which is used by an apparatus 100 for supporting a diagnosis of the ROI according to an aspect of FIG. 1.

First, a determination of whether the apparatus 100 has detected the ROI occurs at 510. If the ROI has not been detected, a determination of whether the apparatus 100 receives a new image from an image collecting device occurs at 560, and if a new image is collected, the apparatus 100 detects the ROI again at 510.

Then, if the ROI has been detected, the apparatus 100 determines, as a standard image, an image where the ROI is detected, among the images received from the image collecting device at 520. The apparatus 100 may receive a plurality of images from the image collecting device from a moment in time when the ROI begins to be detected to a moment in time when its detection ends, one of which may be determined as the standard image by a standard image determiner 110.

Here, the CAD system may automatically detect candidate image having an unusual shadow as an ROI. In detecting the candidate image having the unusual shadow, the standard image determiner may detect a shadow of a strange mass indicating a cancer, etc., or a shadow of high-concentration micro-calcification by applying various parameters for analyzing images to a medical image and processing the various parameters. However, since there may be various examples of detecting a standard image, the present disclosure does not need to be limited thereto.

Then, the apparatus 100 extracts one or more candidate images with respect to the standard image at 530. For example, the apparatus 100 may extract, as the candidate image, an image existing within a predetermined time around a moment in time when the standard image is acquired. For example, the apparatus 100 may extract, as the candidate image, an image with a predetermined range of time from a few seconds before to a few seconds after the standard image is acquired.

In addition, the apparatus 100 may extract, as the candidate image, an image existing within a predetermined time around a moment in time when the ROI is detected from the image that has been received from the image collecting device. At this time, with regard to the image received in real time from the image collecting device, the candidate image may be extracted in real time. For example, as the plurality of images is received from the image collecting device, the ROI that has not been detected from the previous image may be detected. At this time, the apparatus 100 may extract, as the candidate image, an image with a predetermined range of time from a moment in time before the ROI is detected to a moment in time after its detection ends based on a moment in time when the ROI is detected from the received image. Here, the predetermined range of time may be the time set in advance with reference to the number of images acquired per a second.

Also, the apparatus 100 may extract the candidate image on a basis of a degree of similarity between the images received from the image collecting device and the standard image. Generally, the CAD system may determine the degree of similarity between the received image and the standard image. Here, the degree of similarity may be calculated by extracting features from the standard image and comparing, with a degree of conformity, whether features corresponding to the standard image are in the images received from the image collecting device. For example, in a case in which the image received from the image collecting device is the image acquired after capturing a part that is far away from the ROI, a degree of similarity between the image received from the image collecting device and the standard image may be prominently low. To exclude such a case, the apparatus 100 may extract, as the candidate image, an image with similarity of more than a predetermined level. At this time, since the predetermined level may be set differently as a user's need, the present disclosure does not need to be limited thereto. For example, in a case in which a user wants to set a range of the candidate image to be broad, the user may request similarity of more than 50%, or may extract a candidate image with similarity of more than 90% so as to acquire a candidate group that matches even more with the standard image.

Then, the apparatus 100 may select one or more comparison images from the candidate image so as to support a diagnosis of the ROI at 540. In an aspect, in an operation of selecting a comparison image, the apparatus 100 may select, as the comparison image from the candidate image, an image with respect to a specific moment in time, such as a moment in time immediately before or when the ROI is detected, or may select the comparison image with respect to one moment in time within a range of a series of continuous time from a moment in time when the ROI is detected to a moment in time when its detection ends. Since there are various examples related thereto, the present disclosure may not be limited thereto. The apparatus 100 may select a plurality of comparison images at a predetermined time interval.

The apparatus 100 may select the comparison image on a basis of a degree of comparison between the ROI of the standard image and an area of the candidate image, wherein the area corresponds to the ROI of the standard image. Here, the degree of comparison between the ROI of the standard image and the area of the candidate image may be calculated by comparison of at least one or more of: coordinates, a shape, a size, a form, a texture, a shadow; attributes, and relation between surrounding images. As larger degree of comparison indicates a greater difference in the image from the ROI of the standard image; and a lesser degree of comparison indicates a greater similarity between the image and the ROI of the standard image. The calculated degree of the comparison may be used in selection of the comparison image as needed. The image with the big degree of comparison is selected as the comparison image to be compared to the ROI of the standard image such that a difference may be shown; and the image with the small degree of comparison is selected as the comparison image to be compared to the ROI of the standard image such that similarity may be shown.

The apparatus 100 may select a comparison image based on a degree of similarity between a non-ROI of the standard image and the area of the candidate image, wherein the area corresponds to the non-ROI of the standard image. For example, in extracting feature points form the standard image and the candidate image, the comparison image selector 130 may select the comparison image with a high degree of similarity by comparing feature points only with respect to the other area except for feature points of the ROI of the standard image and the area of the candidate image, wherein the area corresponds to the ROI of the standard image. In such a case, the standard image and the candidate image have similar characteristic components because they are captured at a similar angle, direction, and moment in time, but the standard image and the candidate image are different from each other only with respect to the ROI.

The apparatus 100 may select the comparison image in consideration of a probability of the area of the candidate image to be a lesion based on information of characteristics of the lesion, wherein the area has been extracted to correspond to the ROI of the standard image. To this end, the apparatus 100 may store in advance information related to the characteristics of the lesion. The information of the characteristics of the lesion may include data related to an image, such as a shape, a size, brightness, a texture, and a correlation to surrounding images; data according to a type, such as a benign or malignant tumor; and data according to statistics, such as a lesion's pattern and sample as well as other characteristics of the lesion. Based on those, the apparatus 100 may calculate the probability of the ROI to be a lesion, wherein the ROI has been detected from the area that corresponds to the ROI of the standard image so that an image with a high probability to be a lesion may be selected as the comparison image.

The apparatus 100 may select, from the candidate image, a comparison image that has been acquired by making, into a video, images existing within a predetermined time. Here, the predetermined time may be a time, which is from a few seconds before the ROI is detected from the extracted area to a moment in time its detection ends.

Then, the apparatus 100 may provide an output result of the standard image and the selected comparison image at 550. For example, the apparatus 100 may solely output the standard image and the comparison image by using at least one or more arrangements in combination of a single, front and rear, left and right, or upper and lower format. For example, the apparatus 100 may solely output only one selected comparison image, or output a plurality of the comparison images by using a left and right arrangement. The apparatus 100 may arrange the standard image on the right, and the comparison image on the left; and in a case in which the plurality of the comparison images are selected, the apparatus 100 may arrange the plurality of the comparison images in order at the bottom. In addition, the apparatus 100 may output an image acquired by marking the ROI of the standard image and the area of the comparison image with a marker, wherein the area corresponds to the ROI of the standard image, or by changing a magnification of the extracted area of the comparison image.

Furthermore, the apparatus 100 may further output related information on the ROI, such as a detection moment in time of the ROI, a location of the ROI, a degree of similarity between the standard image and the comparison image, a degree of contrast between the ROIs, characteristics of a lesion, a probability of the ROI to be a lesion.

The apparatuses, units, modules, devices, and other components illustrated in FIGS. 1-11, for example, that may perform operations described herein with respect to FIGS. 1-11, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing instructions or software that are executed by the processing device, processor, or computer and that may control the processing device, processor, or computer to implement one or more methods described herein. Hardware components implemented by a processing device, processor, or computer execute instructions or software, such as an operating system (OS) and one or more software applications that run on the OS, to perform the operations described herein with respect to FIGS. 1-11, for example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described herein may be performed by a processing device, processor, or a computer as described above executing instructions or software to perform the operations described herein.

Instructions or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the instructions or software include machine code that is directly executed by the processing device, processor, or computer, such as machine code produced by a compiler. In another example, the instructions or software include higher-level code that is executed by the processing device, processor, or computer using an interpreter. Based on the disclosure herein, and after an understanding of the same, programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processing device, processor, or computer to implement the hardware components, such as discussed in any of FIGS. 1-11, and perform the methods as described above in any of FIGS. 1-11, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processing device, processor, or computer so that the processing device, processor, or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processing device, processor, or computer.

What is claimed is:

1. An apparatus for supporting a diagnosis of a region of interest (ROI), the apparatus comprising:
   a medical imaging machine comprising:
      a memory configured to store instructions therein; and
      at least one processor configured, upon execution of the instructions, to:
         capture a plurality of images,
         analyze the plurality of images,
         determine an image where the ROI is detected, from among the plurality of images as a standard image,
         extract at least one image, which is associated with the standard image, from among the plurality of images as at least one candidate image,
         compare the ROI of the standard image and a corresponding area of the at least one candidate image, respectively, and
         select at least one image, which is contrasted from the standard image by more than a pre-set degree, from among the extracted at least one candidate image as at least one comparison image for supporting a diagnosis of the detected ROI of the standard image based on a result of the comparison; and
   a display configured to display the standard image and the at least one comparison image.

2. The apparatus of claim 1, wherein the at least one processor is further configured to extract the at least one candidate image from among images received within a predetermined time around a moment in time when the determined standard image is acquired or a moment in time when the ROI is detected from the received plurality of images.

3. The apparatus of claim 1, wherein the at least one processor is further configured to extract the at least one candidate image based on a degree of similarity between a received plurality of images and the standard image.

4. The apparatus of claim 1, wherein the at least one processor is further configured to select the at least one comparison image from among the at least one candidate image in at least one of a moment in time immediately before the ROI is detected, a moment in time when the ROI is detected, or a time from a moment in time when ROI is detected to a moment in time when its detection ends.

5. The apparatus of claim 1, wherein the at least one processor is further configured to select the at least one comparison image based on a degree of similarity between a non-ROI of the standard image and an area corresponding to the non-ROI of the at least one candidate image.

6. The apparatus of claim 1, wherein the at least one processor is further configured to select the at least one comparison image based on a probability that the corresponding area of the at least one candidate image is a lesion, the probability being based on information of characteristics of the lesion.

7. The apparatus of claim 1, wherein the at least one processor is further configured to select the at least one comparison image which are video images made from the candidate images within a predetermined time.

8. The apparatus of claim 1, wherein the display is further configured to output the standard image and the at least one comparison image by using an arrangement comprising at least one of a single, front and rear, left and right, or upper and lower layout.

9. The apparatus of claim 1, wherein the display is further configured to output the ROI of the standard image and the corresponding area of the at least one comparison image by using a marker or changing a magnification.

10. The apparatus of claim 1, wherein the display is further configured to provide related information comprising at least one of:
    a detection moment in time of the ROI, coordinates of the ROI, a degree of similarity between the standard image and the at least one comparison image, a degree of contrast between the ROI of the standard image and the ROI of the at least one candidate image, characteristics of a lesion, or a probability that the ROI is a lesion.

11. A method of supporting a diagnosis of a region of interest (ROI) by a medical imaging machine, the method comprising:
    capturing, by the medical imaging machine, a plurality of images;
    analyzing the plurality of images;
    determining, as a standard image, an image where an ROI is detected among the plurality of images;
    extracting, as at least one candidate image, at least one image, which is associated with the standard image, among a plurality of images;
    comparing the ROI of the standard image and a corresponding area of the at least one candidate image, respectively;

selecting, as at least one comparison image for supporting a diagnosis of the ROI of the standard image, at least one image, which is contrasted from the standard image by more than a pre-set degree, among the at least one candidate image based on a result of the comparison; and displaying, on a display, the standard image and the at least one selected comparison image.

12. The method of claim 11, wherein the extracting of the at least one candidate image comprises extracting the at least one candidate image from among images received within a predetermined time around a moment in time when the determined standard image is acquired, or a moment in time when the ROI is detected from the received plurality of images.

13. The method of claim 11, wherein the extracting of the at least one candidate image comprises extracting the at least one candidate image based on a degree of similarity between a received plurality of images and the standard image.

14. The method of claim 11, wherein the selecting of the at least one comparison image comprises:
selecting the at least one comparison image from among the at least one candidate image in at least one of a moment in time immediately before the ROI is detected, a moment in time when the ROI is detected, or a time from a moment in time when ROI is detected to a moment in time when its detection ends.

15. The method of claim 11, wherein the selecting of the at least one comparison image comprises:
selecting the at least one comparison image based on a degree of similarity between a non-ROI of the standard image and an area corresponding to the non-ROI of the at least one candidate image.

16. The method of claim 11, wherein the selecting of the at least one comparison image comprises:
selecting the at least one comparison image based on a probability that the corresponding area of the at least one candidate image is a lesion, the probability being based on information of characteristics of the lesion.

17. The method of claim 11, wherein the displaying comprises:
outputting the standard image and the at least one comparison image by using an arrangement comprising at least one of a single, front and rear, left and right, or upper and lower layout.

18. The method of claim 11, wherein the displaying comprises:
outputting the ROI of the standard image and the corresponding area of the at least one comparison image by using a marker or changing a magnification.

19. The method of claim 11, wherein the displaying comprises displaying related information, comprising at least one of:
a detection moment in time of the ROI, coordinates of the ROI, a degree of similarity between the standard image and the at least one comparison image, a degree of contrast between the ROI of the standard image and the ROI of the at least one candidate image, characteristics of a lesion, or a probability that the ROI is a lesion.

20. A non-transitory computer-readable medium storing program instructions therein for configuring at least one processor to perform the method of claim 11.

* * * * *